US012050616B2

(12) United States Patent
Hu et al.

(10) Patent No.: US 12,050,616 B2
(45) Date of Patent: Jul. 30, 2024

(54) SYSTEM AND METHOD FOR EXTRACT, TRANSFORM, AND LOAD (ETL) PIPELINE PROCESSING

(71) Applicant: KONINKLIJKE PHILIPS N.V., Eindhoven (NL)

(72) Inventors: Yiyi Hu, Suzhou (CN); En Ouyang, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 36 days.

(21) Appl. No.: 17/781,190

(22) PCT Filed: Dec. 3, 2020

(86) PCT No.: PCT/EP2020/084346
§ 371 (c)(1),
(2) Date: May 31, 2022

(87) PCT Pub. No.: WO2021/110785
PCT Pub. Date: Jun. 10, 2021

(65) Prior Publication Data
US 2023/0004574 A1  Jan. 5, 2023

(30) Foreign Application Priority Data

Dec. 3, 2019  (WO) ................. PCT/CN2019/122588
Apr. 6, 2020  (EP) ..................................... 20168225

(51) Int. Cl.
*G06F 7/00* (2006.01)
*G06F 8/41* (2018.01)
*G06F 16/25* (2019.01)

(52) U.S. Cl.
CPC ............ *G06F 16/254* (2019.01); *G06F 8/433* (2013.01)

(58) Field of Classification Search
CPC ............................... G06F 16/254; G06F 8/433
(Continued)

(56) References Cited

U.S. PATENT DOCUMENTS 10,296,524 B1   5/2019  Tung
2019/0312869 A1* 10/2019  Han .................... G06F 21/64
2020/0012738 A1*  1/2020  Tung .................. G06F 16/9024

FOREIGN PATENT DOCUMENTS

CN       107315834 A    11/2017

OTHER PUBLICATIONS

International Search Report and Written Opinion of PCT/EP2020/084346, dated Feb. 19, 2021.

(Continued)

*Primary Examiner* — Isaac M Woo (57) ABSTRACT

Disclosed is an ETL pipeline system including an interface configured to obtain a plurality of graph configuration components. Each graph configuration component includes information representative of one or more computational logic rues. The system further includes a computation graph generator configured to generate a computation graph based on the obtained graph configuration components. The generated computation graph includes node for each graph configuration component and one or more links representative of relationships between the nodes. The system further includes a computation graph adaptor configured to receive, from an external source, external information relating to the graph configuration components, and to adapt the generated computation graph based on the external information. The system further includes a computation graph runner configured to run the adapted computation graph.

13 Claims, 8 Drawing Sheets

(58) Field of Classification Search
USPC .................................................. 707/600–899
See application file for complete search history.

(56) References Cited

OTHER PUBLICATIONS

Jain, Nilesh et al "GraphBuilder: Scalable Graph ETL Framework", First International Workshop on Graph Data Management Experiences and Systems, Jan. 2013, pp. 1-6.

Vassiliadis, P et al "A Generic and Customizable Framework for the Design of ETL Scenarios", Information Systems, vol. 30, No. 7, Nov. 2005, pp. 492-525.

Marcua, Marek "Integration of Data from Heterogeneous Sources using ETL Technology", Computer Science, vol. 15, No. 2, 2014, pp. 109-132.

Choi, Edward et al "GRAM: Graph-based Attention Model for Healthcare Representation Learning", Machine Learning, 2016.

Bodenreider, Olivier, 'The Unified Medical Language System (UMLS): intergrating biomedical terminology', Nucleic Acids Research, vol. 32, pp. D267-D270, Jan. 2004.

Index—FHIR v3.0.1'. [Online]. Available: http://hl7.org/fhir/. [Accessed: Nov. 25, 2018].

\* cited by examiner

SYSTEM AND METHOD FOR EXTRACT, TRANSFORM, AND LOAD (ETL) PIPELINE PROCESSING

CROSS-REFERENCE TO PRIOR APPLICATIONS

This application is the U.S. National Phase application under 35 U.S.C. § 371 of International Application No. PCT/EP2020/084346, filed on Dec. 3, 2020, which claims the benefit of CN Patent Application No. PCT/CN2019/122588, filed on Dec. 3, 2019 and European Patent Application No. 20168225.9, filed on Apr. 6, 2020. These applications are hereby incorporated by reference herein.

FIELD OF THE INVENTION

The invention relates to the field of data processing, and in particular the field of extract, transform, and load (ETL) pipeline processing

BACKGROUND OF THE INVENTION

Extract, transform, and load (ETL) is a pipeline (i.e. a set of processes) utilized by data processing and analytics systems to collect data from various sources, transform the data according to business requirements, and load it into a destination data store. In ETL systems, the transformation takes place in a specialized engine, where staging tables are usually used to temporarily hold data as it is being transformed and ultimately loaded to a destination. There are many traditional operations involved during the process of data transformation, such as filtering, sorting, aggregating, joining, cleaning, deduplication, and validating.

For medical data applications, complex data transformations may need to be performed to generate meaningful insights. Nevertheless, these transformations must first depend on data being structured into a table of phenotypes (i.e. data elements) before they can be utilized for more advanced processing. Therefore, in traditional medical data processing systems, the extraction step involves abstracting useful phenotypes. Transformation refers to computation and derivation performed based on extracted phenotypes. Transformation outputs can be new phenotypes that are derived from existing phenotypes or computational results of decision rules, such as diagnosis or treatment selection.

However, in existing ETL systems, although natural language processing (NLP) techniques are widely employed for phenotype extraction, there is very limited architecture to support knowledge driven computations during the transformation phase. Separate systems or applications are usually implemented to handle advanced computations after the ETL has completed, which results in loss of coherency and introduces more overheads.

Data extraction is traditionally handled by independent NLP modules. Consequently, phenotype extractors are often separated with the secondary usage (such as data aggregation) of extracted data. This results in having to compare performance of multiple phenotype extraction algorithms, reducing efficiency.

Graph structure is traditionally used to encode clinical knowledge, since it is capable of capturing complex relationships among medical concepts, which benefits many applications. However, the graph representation itself is non-computable. In a conventional ETL pipeline, there is no paradigm to enable beneficial usage of knowledge to drive computations. This is typically achieved by hard-coding programming rules during data transformation. As a result, the method lacks flexibility in coping with changes (e.g. change of input data types, algorithms and decision logics).

SUMMARY OF THE INVENTION

The invention is defined by the claims.

According to examples in accordance with an aspect of the invention, there is provided an ETL pipeline system including an interface configured to obtain a plurality of graph configuration components. Each graph configuration component includes information representative of one or more computational logic rules. The system further includes a computation graph generator configured to generate a computation graph based on the obtained graph configuration components. The generated computation graph includes a node for each graph configuration component and one or more links representative of relationships between the nodes. The system further includes a computation graph adaptor configured to receive, from an external source, external information relating to the graph configuration components, and to adapt the generated computation graph based on the external information. The system further includes a computation graph runner configured to run the adapted computation graph.

Proposed are concepts for an ETL architecture that may be particularly beneficial for medical data processing, where phenotyping and clinical knowledge computing are embedded coherently in a single architecture. Such concepts may allow for clinical knowledge to be configured independently from actual clinical data. However, during running time, the clinical data can flow though the structure, where database operations, phenotyping algorithms and decision logics are applied to the data flow, resulting in targeted computation outcomes.

It is proposed to provide a graph configuration file (such as a DSL) to construct a computing graph intuitively. It is further proposed to provide a graph driver to parse, construct, and execute a computation graph. It is further proposed to provide an information modelling technique to encode a relationship between a phenotype and a clinical document. A proposed backend graph data structure can be integrated with facts-based knowledge graph and data-based knowledge graphs in order to benefit downstream application. Further, the application of multi-layered computation, local re-computation and adaptive computation are proposed for application in the ETL pipeline system.

Proposed are concepts for an ETL architecture that may be particularly beneficial for medical data processing. In particular, the claimed invention provides an ETL pipeline system including an interface configured to obtain a plurality of graph configuration components. Each graph configuration component includes information representative of one or more computational logic rules. The proposed invention generates a computation graph based on the obtained graph configuration components, wherein the generated computation graph includes a node for each graph configuration component and one or more links representative of relationships between the nodes. External information (such as a user-defined graph configuration component and/or prior knowledge) relating to the graph configuration components is then employed to adapt the generated computation graph.

In an embodiment, each graph configuration component may comprise at least one of a database connection, a document, a data element, an algorithm, and a computational logic rule.

In an embodiment, the algorithm may comprise a computational decision rule and/or the computational logic rule may comprise a computational decision rule.

In an embodiment, the external information may comprise at least one of a user-defined graph configuration component and external knowledge from an external knowledge database. By way of example, the external knowledge may comprise a previous/prior computation graph stored in a database. Such a previous/prior computation graph may be added to the generated computation graph to form the adapted computation graph. That is, the generated computation graph may be adapted by incorporation of a previous/prior computation graph. By way of further example, the user-defined graph configuration component may comprise graph configuration components that are configured to redefine or amend a computation graph.

In an embodiment, the interface may comprise at least one of a user interface and an application programming interface.

In an embodiment, the system further comprises a graph configuration file and the user-defined graph configuration component comprises redefining the graph configuration file or dependency information indicative of dependency relationships among different graph configuration components.

In an embodiment, the system further comprises a computation graph parser configured to: receive the graph configuration components from the interface; and establish one or more links between different graph configuration components based on the component information and dependency information indicative of dependency relationships among different graph configuration components.

In an embodiment, the computation graph parser may further be configured to establish a link between the data element and the document based on data items associated with the data element and/or the document.

In an embodiment, the data items may comprise at least one of an identifier, a timestamp, a content item, a context item, and an encoding object.

In an embodiment, the computation graph runner may further be configured to run the adapted computation graph in an adaptive high-throughput computation.

According to examples in accordance with an aspect of the invention, there is provided a medical data processing system comprising the ETL pipeline system described above.

According to examples in accordance with an aspect of the invention, there is provided a method for ETL pipeline processing. The method comprises obtaining a plurality of graph configuration components, each graph configuration component comprising information representative of one or more computational logic rules. The method further comprises generating a computation graph based on the obtained graph configuration components, the generated computation graph comprising: a node for each graph configuration component; and one or more links representative of relationships between the nodes. The method further comprises receiving, from an external source, external information relating to the graph configuration components. The method then comprises adapting the generated computation graph based on the external information and running the adapted computation graph.

According to examples in accordance with an aspect of the invention, there is provided a computer program product for ETL pipeline processing, wherein the computer program product comprise a computer readable storage medium having program instructions embodied therewith, the program instructions executable by a processing unit to cause the processing unit to perform a method. The method comprises obtaining a plurality of graph configuration components, each graph configuration component comprising information representative of one or more computational logic rules. The method further comprises generating a computation graph based on the obtained graph configuration components, the generated computation graph comprising: a node for each graph configuration component; and one or more links representative of relationships between the nodes. The method further comprises receiving, from an external source, external information relating to the graph configuration components. The method then comprises adapting the generated computation graph based on the external information and running the adapted computation graph.

According to examples in accordance with an aspect of the invention, there is provided a processing system comprising at least one processor and the computer program product described above, wherein the at least one processor is adapted to execute the computer program code of said computer program product.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an ETL pipeline system including an interface configured to obtain a plurality of graph configuration components. Each graph configuration component includes information representative of one or more computational logic rules. The system further includes a computation graph generator configured to generate a computation graph based on the obtained graph configuration components. The generated computation graph includes a node for each graph configuration component and one or more links representative of relationships between the nodes. The system further includes a computation graph adaptor configured to receive, from an external source, external information relating to the graph configuration components, and to adapt the generated computation graph based on the external information. The system further includes a computation graph runner configured to run the adapted computation graph.

Figure 1:
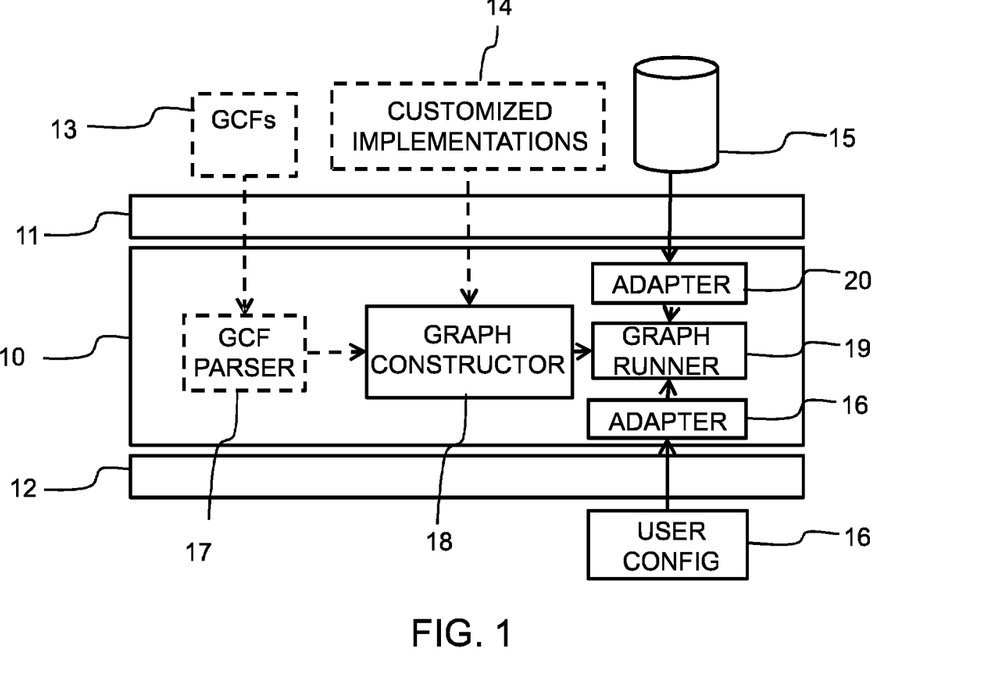
FIG. 1 is a simplified block diagram of an ETL pipeline system.

FIG. 1 shows an ETL pipeline system according to an embodiment. The system comprises an interface 11, 12 for user interactions with the system. This assists the user in creating (high level) computable knowledge representations according to their specific requirements. The system of FIG. 1 includes two interfaces 11, 12. Interface 12 is a user interface (UI) and enables "drag-and-drop" of key components at the system front-end, resulting in faster computation graph creation. Interface 11 is an application programming interface (API) that serves the same purpose as the user interface 12 but interacts at a programming level. The API 11 predominantly supports three actions. First, submission of specially designed graph configuration files (GCFs) 13, which are to be transformed later into a computable graph. Second, submission and saving/loading of user-defined (UDF) algorithms 14 regarding database transactions, data computations, and NLP phenotyping to a central function repository. Third, communicating with a common graph database 15, which can either save the created graph structure into the graph database 15 or load existing graphs from the graph database 15 into the system.

There exist state transitions flows in between the above-mentioned components. Graph configurations (both via UI and API) are converted into underlying data structure of directed-acyclic-graph (DAG). DAG can be converted back-and-forth to data structures in a common graph database (e.g. Neo4j, GraphDB, and Cayley). To this point, DAG is a static graph structure that encodes necessary information for running. It is further converted into a runnable graph which can be executed at run time.

A Graph Configuration File (GCF) 13 is a container for a graph structure that performs both data extraction and decision rule computation tasks. By following a specially designed paradigm by us, users are allowed to declare-or-define a set of key components, i.e. database connections, documents, phenotypes, algorithms and computational logics and organize them into a group of GCFs 13, to fulfil certain computation task. GCFs 13 can be created as human-readable textual files in the format of JSON and YAML. In each file, user defines structures that include key components to represent a single node in graph. Multiple and nested nodes are allowed to be defined within a same file or distributed into several files in a same folder. Previously-defined GC nodes either in the same file or in external files in the same folder can be referenced by name during parsing.

The GCF 13 is configured to absorb existing knowledge into the common graph structure supported by our system at programming level. This is sometimes difficult and/or time-consuming for human to curate via a UI. For instance, BCLC and Child-Pugh scoring systems can be persisted into our system via GCFs and be computed at running time to derive staging a Child-Pugh score for liver cancer patient.

The graph configuration UI 12 serves as an alternative to a GCF 13 to allow construction of graph representation of clinical knowledge and decision rules intuitively. A UI adapter 16 is responsible for transforming front-end input into the underlying data structure (DAG). In the UI, users are allowed to construct a graph by creating nodes and links. For each node, a user can specify algorithms to process data flow travelling through that node or implement decision logics that takes input from parent nodes of current node.

A graph driver 10 sits at the core of the system. It is responsible for constructing a computational graph that is able to take data flow and making the graph run to deliver desired results for user. Graph driver 10 comprises three main components of: GCF Parser (GCFP) 17, Graph Constructor (GST) 18, graph runner (GRN) 19 and two adapters 16, 20. Implementation of a graph driver is not limited to specific programming language; however, developers follow the same philosophy as well as common interfaces in each system component to realize language specific drivers.

Taking configuration files 13 as input (formatted in JSON, YAML or XML), the GCFP 17 transforms the graph definition in files 13 into individual components (e.g. database connections, documents, phenotypes, algorithms and computational logics) under corresponding namespaces and then links namespaces together as linked objects to prepare for graph construction.

Figure 3:
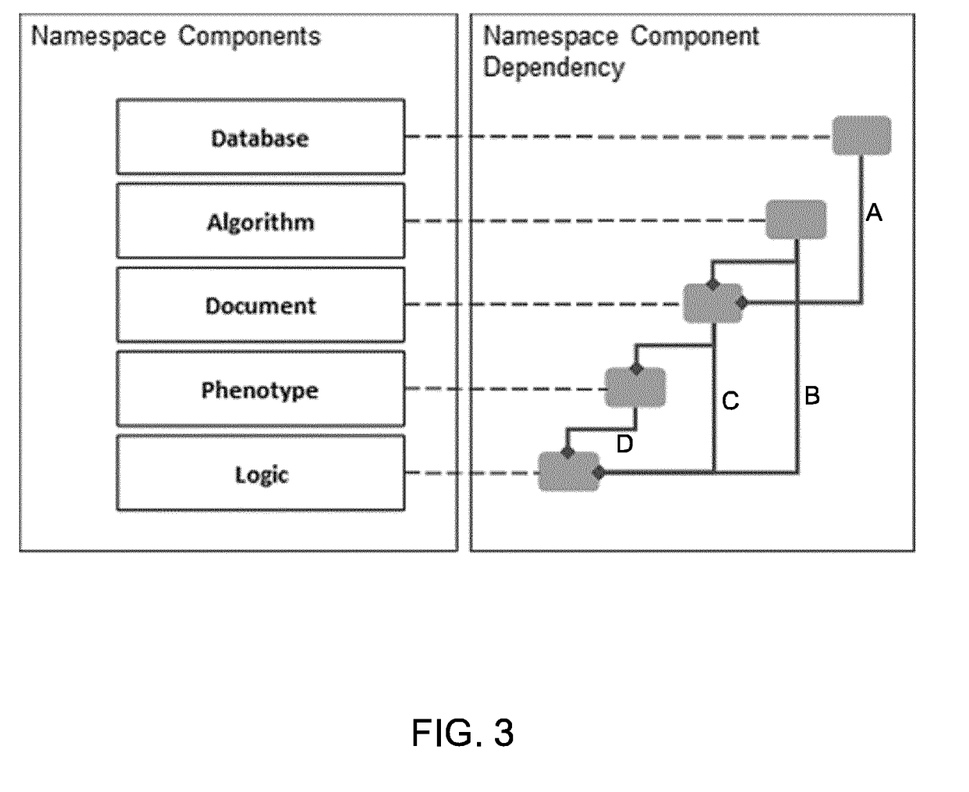
FIG. 3 shows a dependency relationship among different graph configuration components.

More specifically, each GCF 13 may comprise definitions for different graph configuration components, By way of example, FIG. 3 defines an exemplary se of dependency relationships between different graph configuration components in relation to various namespace components. More specifically, the solid line labelled "A" defines the dependency between database and document, the solid line labelled "B" defines the dependency between algorithm and logic. The solid line labelled "C" defines the dependency between document and logic. The solid line labelled "D" defines the dependency between phenotype and logic Such dependency relationships may be defined by a user.

The GCFP 17 receives the graph configuration components from the interface 11, and then establishes a link between different graph configuration components based on the component information and dependency information indicative of dependency relationships among different graph configuration components.

The GST 18 can then translate the linked components into graph nodes and relations. That is the GST 18 takes the linked namespace objects and constructs an underlying data representation, where linked components are translated into graph nodes and relations among nodes in the form of DAG. In addition, during the construction process, the GST 18 frequently interacts with graph configuration API to load/save components from/to a function repository (database that keeps all functional objects). If a specified component in GCF 13 already exists in this repository, the component reference is directly fetched from the repository. Otherwise, the specified component is new, and the GST 18 then saves it to function repository for re-use.

Figure 4:
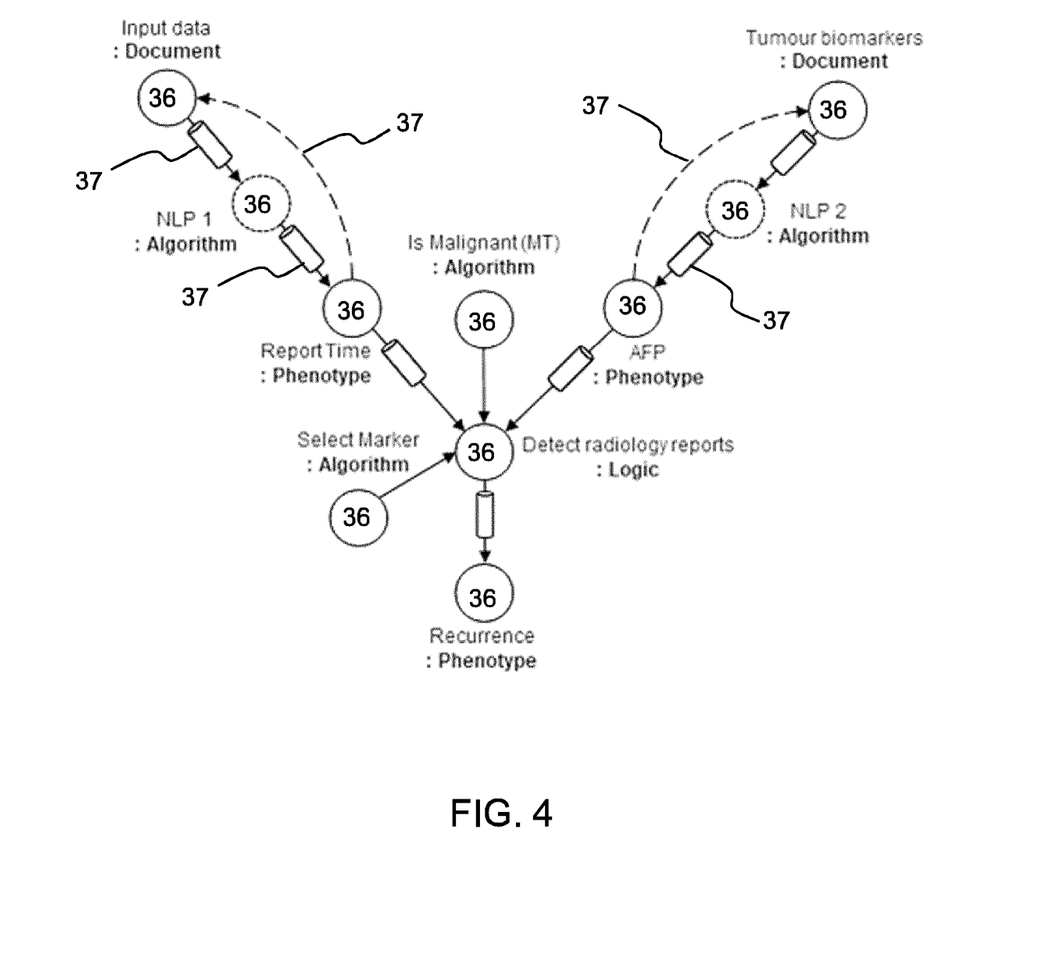
FIG. 4 shows an example of a generated computation graph.

The GRN 19 first serves as an injector that injects all necessary information to run the graph, for example, code objects and recursively defined GC components. In the meantime, graph runner 19 is a connector that takes the graph to existing implementations of graphs-based parallel execution systems. As an example, FIG. 4 shows an example of a generated computation graph. The generated computation graph may be output via the interface(s) 11 or 12. The generated computation graph includes a node 36 for each graph configuration component and one or more links 37 representative of relationships between nodes 37.

The two adapters, namely graph database adapter 20 and UI adapter 16 are included in the driver 10. The UI adapter is responsible for converting front-end input into DAG structure and vice versa, presenting a constructed DAG to front-end user. Also, the graph DB adapter harmonizes data structure used by our system and existing graph DB systems.

Figure 2:
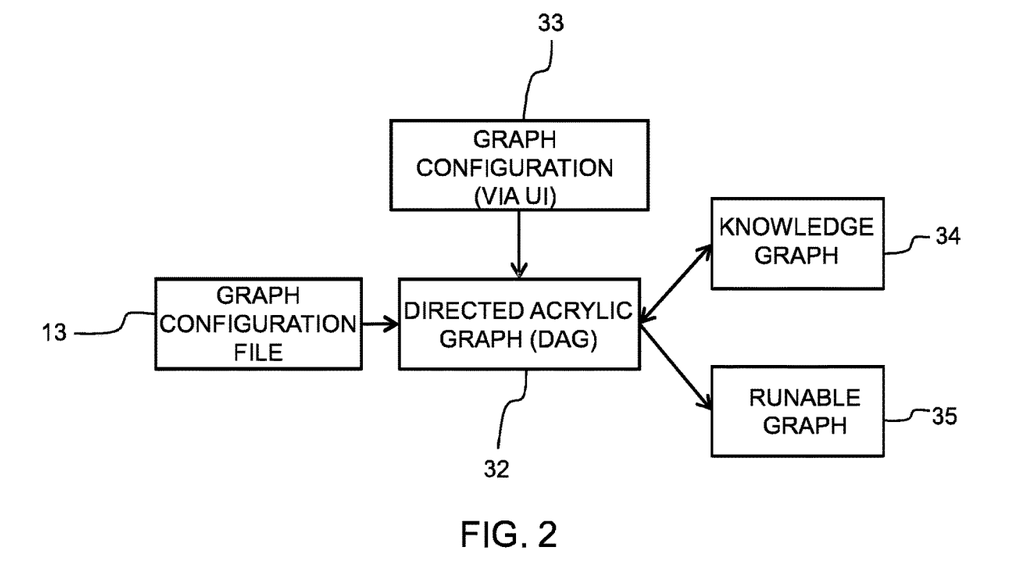
FIG. 2 shows a simplified block diagram of a state transition flow in an ETL pipeline system.

Referring to FIG. 2, there is depicted an illustration of state transition flow among system components according to an embodiment. From a GCF 13 and graph configuration 33 provided via a user interface, a DAG 32 is constructed. The DAG 32 can be converted back-and-forth to data structures in knowledge graph 34. The DAG 32 is further converted into a runnable graph 35 which can be executed at run time.

Figure 5:
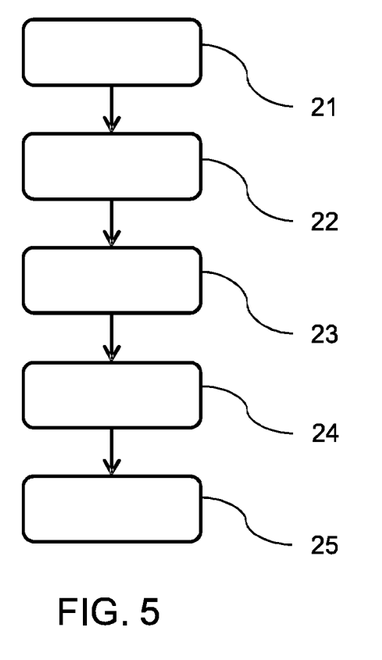
FIG. 5 is a simplified flow diagram of a method for ETL pipeline processing according to an embodiment.

Referring now to FIG. 5, there is depicted a simplified flow diagram of a method for ETL pipeline processing according to an embodiment. The method begins with step 21 of obtaining a plurality of graph configuration components. Here, each graph configuration component comprises information representative of one or more computational logic rules. Next, in step 22, a computation graph is generated based on the obtained graph configuration components. The generated computation graph comprises: a node for each graph configuration component; and one or more links representative of relationships between the nodes. Subsequently, in step 23, external information relating to the graph configuration components is received from an external source. Step 24 then comprises adapting the generated computation graph based on the external information. Finally, in step 25, the adapted computation graph is run.

More specifically, the external information comprises at least one of a user-defined graph configuration component and external knowledge from an external knowledge database. In one embodiment, the external knowledge comprises prior computation graph stored in a database and the prior computation graph is added to the generated computation graph and forms the adapted computation graph. In another embodiment, user-defined graph configuration component comprises redefining or amending graph configuration components via the interface.

A subject may redefine the graph configuration components or the links between the graph configuration components of the generated computation graph using a graphical user interface. For instance, such redefinition may be achieved by dragging the nodes, removing the links or re-connecting the links between different nodes in an interactive visual representation of a computation graph (as illustrated in FIG. 4 for example).

In another embodiment, a user-defined graph configuration component comprises one or more definitions for redefining the graph configuration file and/or the dependency relationships among different graph configuration components. More specifically, the subject can define a different logic (by changing @logic), defining a different algorithm (by changing @algorithm), or adding new components, i.e. the subject dependency.

By way of further explanation, we will firstly describe GCF grammar and GCF parsing, which converts configuration files 13 into linked namespace components. For parsing, we introduce each building blocks. For graph construction, we discuss details of forming a DAG. Data model design will then be explained detail, which deals with the relationship between phenotype and document during graph construction process. It will then be explained how existing knowledge graphs can be combined with proposed embodiments to acquire meaningful results. Finally, details on how embodiments may be employed for efficient computations will be provided.

GCF Grammar

GCF grammar supports declare and definition of key components, which start with a "@" notation followed by component category. Key components fall into five different categories, namely: database; phenotype; document; algorithm; and logic. Each serve different purposes and can be organized into independent structures. Detailed discussion on the five components is provided below in the next section of the description. The difference between declaration and definition depends on whether a component has already being created. To declare a component, just the component name is needed, followed after "@".

To define a component, "@def" keyword must be put inside the body of a component. To save a defined component, a name must be specified using keyword "@name", and a "@save" keyword should be added with value set to 'True'. A user attaches function implementations as a value to "@def", and the function definitions will be persisted into a central repository. Then, the saved component can be declared as mentioned above. GCF grammar supports nested definition of components, but is constrained by namespace dependencies.

The below example shows a task of detecting malignant tumor given radiology report data clusters and tumor biomarkers.

An exemplary GCF that fulfils a task of detecting malignant tumours:

```
"@Document": input_data
"@Document": tumor_markers
"@Phenotype#1": tumor_mention
"@Phenotype#2": report_time
"@Phenotype#3": AFP
"@Algorithm": is_MT
"@Algorithm": select_marker
"@Logic":
    "@name": detect_radiology_reports,
    "@def": |
        for cluster, _in input_data:
            evidence_list = [
                x for x in cluster
                if is_MT(x.tumor_mention)
            ]
            if len(evidence_list) >=2:
                yield (True, cluster[0].report_time)
            elif len(evidence_list) ==1:
                markers=select_marker(tumor_markers)
                if markers.AFP > 20:
                    yield (True, cluster[0].report_time)
                else:
                    yield (False, None)
"@save": True
```

The target is to tell if there is malignant tumor (MT) found inside each radiology report cluster. The decision rule says if more than two radiology reports in a cluster contain malignant tumor mentions, then return true. In another case (less than 2 radiology supports), if there is abnormal AFP (tumor biomarker) found, also return true. Otherwise, return false. In the above example, "@Document: input_data" represents a list of clusters of radiology reports (reports within two month clustered together). "@Document: tumor_markers" injects documents with tumor biomarker information. With imported documents, according to our document-phenotype relation model, "@Phenotype:

tumor_mention" and "@Phenotype: report_time" will be retrieved from corresponding document objects. "@Algorithm: is_MT" and "@Algorithm: select_marker" will trigger the two decision functions to be imported from the repository during graph construction. "select_marker" is the algorithm to choose most recent biomarker data recorded to those radiology reports inside a cluster. "is_MT" is an algorithm to determine according to the "@phenotype: tumor_mention" whether the tumor is malignant. The decision rule is implemented with within "@def" of "@Logic" block. "@save" indicates that this logic will be saved to the function repository with the name "detect_radiology_reports". Next time, this saved function can be imported directly via declaring "@Algorithm: detect_radiology_reports". However, all the imports and code defined so far will not be performed until the graph is constructed and converted as runnable graph and being executed.

Namespace Components

Corresponding to the five key items defined by GCF grammar, there are five functional component objects. Database component is responsible for handling database operations, database connections and transactions such as data query. Phenotype is key-value entities which are meaningful for certain decision rule computation task. Document represents clinical reports that contains a set of phenotypes. Algorithms are special functions that process inputs to acquire outputs. For instance, data extraction algorithms extract concerned phenotype value from clinical narrative data. Logics are also functions like algorithms. However, the difference is that a logic is responsible for making transitions between different nodes.

The inventors have created a bidirectional relation model to represent phenotype and document. Each phenotype and document contains mandatory data items of name/ID, timestamp, content and optional data items of context and encoding. However, content and context has different meanings for phenotype and document respectively. For a document, the content represents the content of report either in narrative form or in structured/semi-structured form. For a phenotype, content is the phenotype value. For a phenotype, the context is the content of the document that contains it. For a timestamp, it is assumed that phenotype timestamp is equal to document timestamp although in some cases they are not. Encoding represents a standardized code which is associated. Usually, this code indicates a category of a phenotype or document entity.

DAG

Taking the exemplary GCF provided above, phenotypes are fetched by NLP phenotyping algorithms which models the phenotyping outcomes using the relational information model discussed above for phenotype and document. In the exemplary GCF above, the NLP algorithm is not explicitly declared. It is assumed that this is done by some pre-configurations. In the example, it is shown explicitly that phenotypes are extracted from documents with NLP algorithms as function nodes in the DAG. Again, this DAG representation is static and nothing is computed until the graph is turned into a runnable graph and executed.

Connection with Knowledge/Ontologies

Here, the connection between the graph structures and graph data in external knowledge graph databases is detailed. Two types of knowledge graphs databases can be connected, i.e. knowledge base with fasts and knowledge base with data. Connection with knowledge has the potential to expand graph processing results to a larger scope by linking entities in a graph with entities outside. This is useful when building intelligent search or question and answering systems (QA).

Knowledgebase with Facts

Facts graphs are existing knowledge graphs and ontologies, such as SNOMED-CT, LOINC, MeSH, Drugbank and so forth. By connecting data nodes in our DAG to such external graphs and ontologies, a key benefit is that concept standardization can be performed and internal and external graphs may be bridged to achieve knowledge expansion automatically. This facilitates the development of processing systems that behave as meaning of the biomedicine and health language is understood.

Knowledgebase with Data

Fast health interoperability resource (FHIR) is a medical standard that defines a set of data resources and so aims to facilitate fast data exchange between medical systems. A FHIR database is essentially a knowledge base with different data resources that can be linked together as graphs. FHIR supports Turtle format, which can be used to store data as RDF triples.

Knowledge Computation

Details of knowledge computing strategies will now be provided. Proposed embodiments may employ the following: (i) adaptively selecting best computation strategy according to data dependency between two nodes in a graph to increase efficiency; (ii) organizing accumulative data and knowledge and into a multi-layer structure that is efficient to compute and easier to track for users; and (iii) local re-computations that allow replaceable graph components into existing computational graphs to optimize system performance efficiently.

Adaptive Computing Structure

A runnable graph is fed into a parallel execution component. The key concept of this component is transforming tree-shaped sequential computation to high-throughput synchronous computation and sequence detection and following decision-making. After the generation of DAG, how to process it efficiently remains a challenge, especially for complex DAG and large-scale data. A computation strategy is proposed that transforms the sequential decision graph computation problem to node status detection and node status sequence mapping. An illustration of this concept is provided in FIG. 6.

Figure 6:
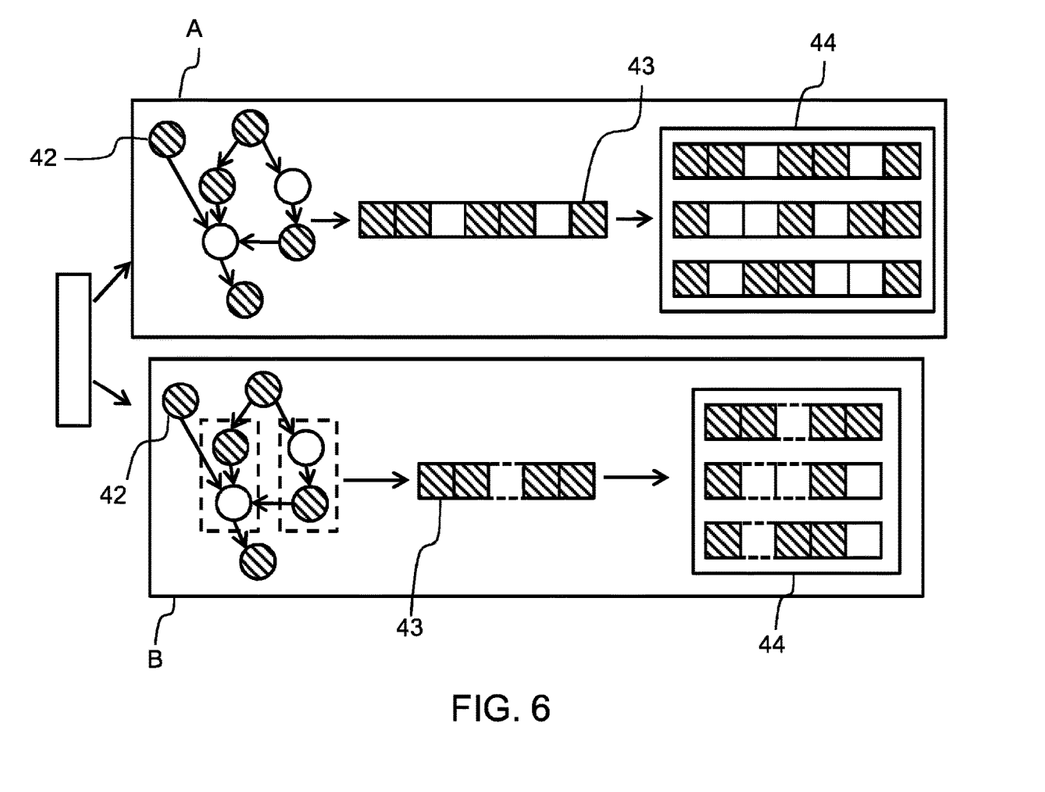
FIG. 6 shows a simplified block diagram of a knowledge computing structure, specifically an adaptive computing structure, implemented in an ETL pipeline system.

In particular, FIG. 6 illustrates a proposed adaptive computation strategy according to an embodiment. Here, sequential graph computing is transformed to high-throughput synchronous status detection and status sequence mapping. In "A", all nodes 42 in the DAG have no data transfer, then every node 42 will be transformed into a status in status sequence 43; In "B", data transfer exists between some nodes 42, those nodes 42 are transformed into one status in status sequence 43.

Firstly, according to a defined GCF, a status sequence list 44 is generated, which enumerates all probable status sequences 43 and its corresponding results. The relationship between status sequence 43 and result can be many-to-one.

As detailed above (in the section entitled "DAG"), an adaptive strategy is employed in the transform process to boost efficiency. In the first situation "A", there is no intermediate data being transferred between two nodes (i.e. no dependency between nodes). Therefore, it can be regarded as an independent decision node, and transformed into a single status in a status sequence. In the second situation "B", where there is data transfer between two nodes (i.e. dependency between nodes) in the DAG, those nodes are merged as a node group, and then transformed to a status in the sequence (as illustrated by the dashed boxes surrounding the nodes that are merged).

There are two key aspects that contribute to efficiency improvement during the process of DAG computation: (a) paralleled node status detection, instead of sequential decision to derive each node status; and (b) status sequence mapping. When large-scale data is fed into the graph, decision status will be generated for every decision node or decision node group. After that, all status will be concatenated to a status sequence in pre-defined order. Then, the system conducts sequence mapping against sequence list to get result. For instance, in a clinical practice to conduct decision-making, the GCF define three nodes (A, B, C), and every node is a binary choice (0 for false, 1 for true), the status sequence "100" representing A is true, B is false, and C is false, the result is "Having disease", meanwhile, the result of "001" can be "Having no disease". All those sequences form a list of status sequences.

Multi-Layer Computation

Multi-layer computation deals with the situation when both data and the number of clinical knowledge graphs being injected are increasing, which is usually the case. Longitudinal data (phenotypes) changes by time, with new data keep coming in, meanwhile, new clinical knowledge continuously being injected into the system. With more data, some computations in stored graphs can be continued. With more completed knowledge, new computations using existing data in the system can be activated to derive new data. For instance, suppose there is a knowledge graph injected that monitors if a patient has relapsed tumour. When there is only one radiology report that supports cancer recurrence, according to clinical knowledge, no judgement can be made. However, when there is one plus radiology support or tumour biomarker support that comes into the system, the computation can be carried on to derive a new data variable on tumour relapse. If accumulated data and knowledge are not well organized, users will never be able to track the process of each computation results.

A proposed system periodically re-runs ETL to take in new data from EMR and carries out computation as described. Here, the data variables created during initial ETL are referred to as base data layer. Newly derived data is placed into new data layers on top of base layer recursively. In particular, after injecting a new knowledge graph, each node in the graph is mapped to a standardized and unique system code via concept encoding. Such encoding is used to build an inverted index of all graph nodes, each associated with graph structures that contain the node as well as the layer number. New input data, based on its data type, is assigned with a concept code via the same encoding process. The concept code is searched with the inverted index to get all graphs that contain a node with the same encoding. This is a very fast look up process. Normally, the node encoding can be covered by already injected graphs, the data is added as a graph node to a matched sequence for further processing. However, for those not covered, it is added as a node to an un-matched sequence. For nodes inside matched sequence, they are added to the system and to active graph computation in deriving new data. The algorithm is described as follows.

The new node is copied and added to all those layers where there exist graph structures in the index that include this node. If the added node can work with other nodes in the same layer to derive a new data value in some graphs, then, either a new layer is created to include this newly derived data node or the new node is added to an existing upper layer. To decide, the algorithm again matches against all graphs only in the upper layers that contains the newly derived node. If there exists an upper layer that contains the node, then the node is added to that layer. If not, a new upper layer parallel to other upper layers is created. In such new layer, all the graph structures that include the newly derived node will be associate with the new layer number.

Initially, there is only one layer called base layer at the bottom. For the nodes in un-matched sequence, there is currently no graph structures in the system that covered them. These data nodes may, or never, be covered by new knowledge graphs injected into the system in the future. Therefore, when new knowledge being injected, the algorithms always checks if nodes from un-matched sequence can be added. If not, these data nodes serves just normal data points in our system.

Figure 7:
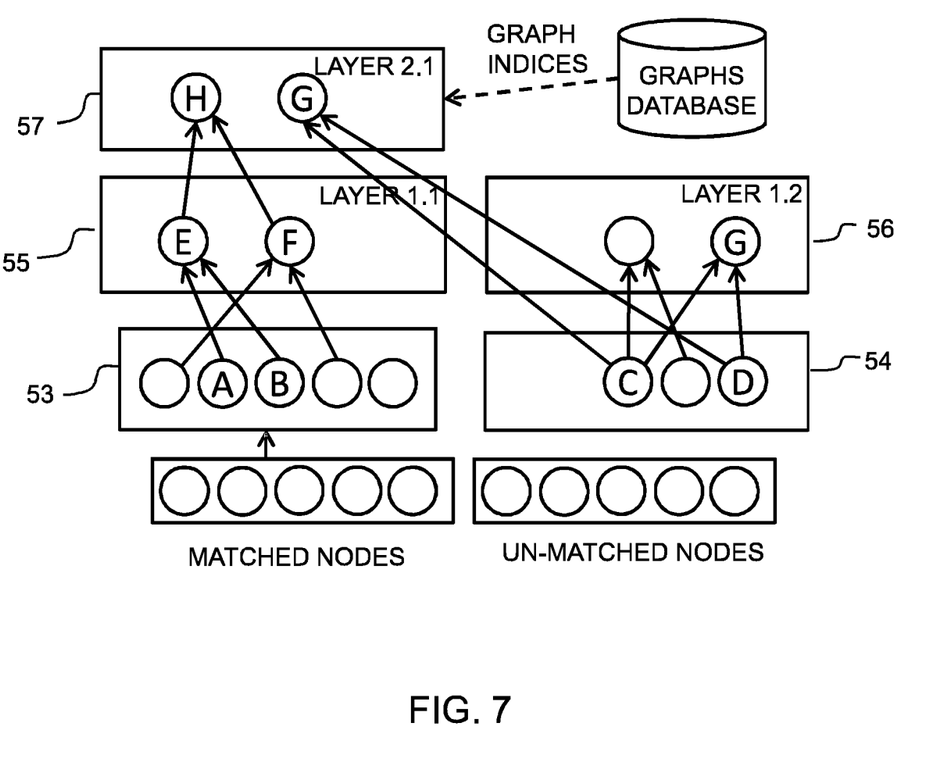
FIG. 7 shows a simplified block diagram of a knowledge computing structure, specifically a multi-layered computer structure, implemented in an ETL pipeline system.

By way of further description, an example is illustrated in FIG. 7. More specifically, FIG. 7 illustrates an example of multi-layered computation and data organization according to a proposed embodiment. A and B of a first base layer 53 can derive E of a Layer 1.1 group 55. E and F further derives H of a Layer 2.1 group 57. However, C and D are not covered by any graphs in A and B's group 53. So a second, parallel base layer 54 is created to include C and D. C and D derives G of a Layer 1.2 group 56. Also, because G is not covered by graphs in E and F in Layer 1.1, and is included by both Layer 1.2 group 56 and Layer 2.1 group 57, G is copied to both layers 56, 57.

The benefit of multi-layer computation is that it is based on fast graph look up and paralleled graph computation. Therefore, it is overall very efficient. Furthermore, a user can clearly shown (by layered organization of information) when data are added and how these data is interacting with existing data by precious ETLs in deriving new data items. The effect such a proposed technique is that, in a same layer, old nodes that contributes to a new node tend to cluster together and also, graph structures that shared same nodes tends to cluster together. This can be leveraged to design a layered information management system, which provides a nice archive of related data and knowledge. With that, a user need not to traverse discrete knowledge graphs to locate each node of their interests. A user can easily check what data elements are missed in order to derive more advanced data nodes (in the upper layer).

Local Re-Computation

A user can reconfigure parts in the graph and specify a node to be re-computed. For example, a user may want to try out a cutting-edge classification algorithm that identifies if a radiology report has indicated relapsed tumour. The user replaces an old algorithm node in the graph and re-runs the graph. However, the re-run will not affect other nodes, only related ones. Similarly, the user can replace any functional nodes in the graph. For instance, the user redefined query transaction of a clinical document from database, making it faster. The proposed system propagates re-computation flows to all downstream nodes that are related to this transaction.

Applications of the Invention

A primary application of the proposed invention is information extraction and ETL. The proposed architecture allows the Extract-step and Transform-step to become easily configurable and more coherently, reducing overheads. Another category of applications falls into knowledge computing and management for decision support. Although examples have been shown above based on rule-based decision making, every function node is replaceable, so that automated algorithms can be plugged and validated within a graph structure. Because the proposed techniques connect medical database with computational knowledge and external knowledgebase, they can contribute to search and QA applications, e.g. medical search engines or Chat-bots. Also, because the proposed system deals with gradually increased data, it can be useful for event monitoring, e.g. recurrence early detection, adverse drug reaction, etc.

Figure 8:
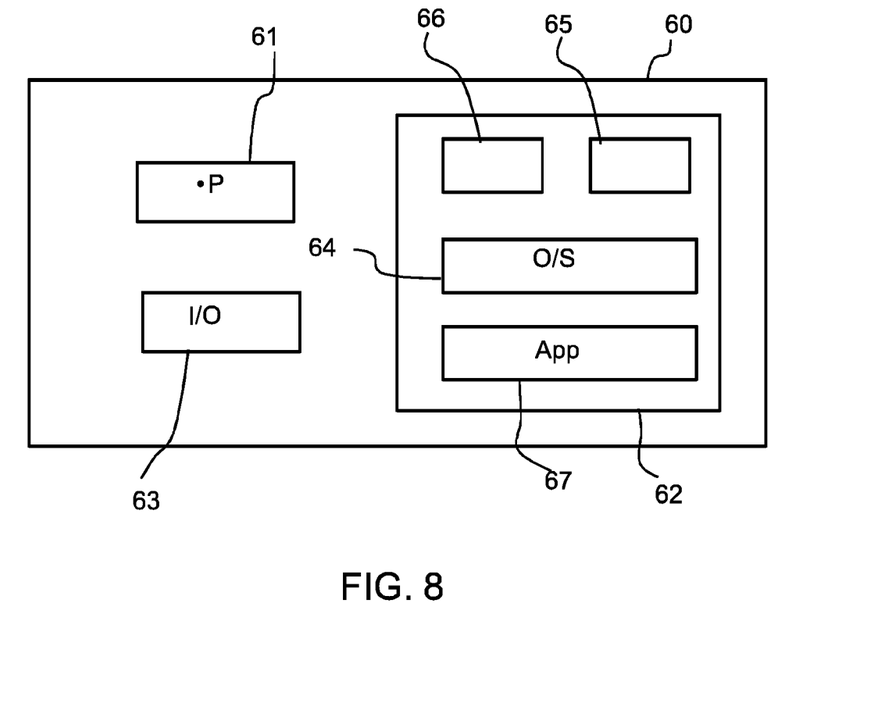
FIG. 8 illustrates an example of a computer for implementing a controller or processor according to an embodiment.

FIG. 8 illustrates an example of a computer 60 for implementing an embodiment of a system as described above.

The computer 60 includes, but is not limited to, PCs, workstations, laptops, PDAs, palm devices, servers, storages, and the like. Generally, in terms of hardware architecture, the computer 60 may include one or more processors 61, memory 62, and one or more I/O devices 63 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 61 is a hardware device for executing software that can be stored in the memory 62. The processor 61 can be virtually any custom made or commercially available processor, a central processing unit (CPU), a digital signal processor (DSP), or an auxiliary processor among several processors associated with the computer 60, and the processor 61 may be a semiconductor based microprocessor (in the form of a microchip) or a microprocessor.

The memory 62 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 62 may incorporate electronic, magnetic, optical, and/or other types of storage media. Note that the memory 62 can have a distributed architecture, where various components are situated remote from one another, but can be accessed by the processor 61.

The software in the memory 62 may include one or more separate programs, each of which comprises an ordered listing of executable instructions for implementing logical functions. The software in the memory 62 includes a suitable operating system (O/S) 64, compiler 65, source code 66, and one or more applications 67 in accordance with exemplary embodiments.

The application 67 comprises numerous functional components such as computational units, logic, functional units, processes, operations, virtual entities, and/or modules.

The operating system 64 controls the execution of computer programs, and provides scheduling, input-output control, file and data management, memory management, and communication control and related services.

Application 67 may be a source program, executable program (object code), script, or any other entity comprising a set of instructions to be performed. When a source program, then the program is usually translated via a compiler (such as the compiler 65), assembler, interpreter, or the like, which may or may not be included within the memory 62, so as to operate properly in connection with the operating system 64. Furthermore, the application 67 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 63 may include input devices such as, for example but not limited to, a mouse, keyboard, scanner, microphone, camera, etc. Furthermore, the I/O devices 63 may also include output devices, for example but not limited to a printer, display, etc. Finally, the I/O devices 63 may further include devices that communicate both inputs and outputs, for instance but not limited to, a network interface controller (NIC) or modulator/demodulator (for accessing remote devices, other files, devices, systems, or a network), a radio frequency (RF) or other transceiver, a telephonic interface, a bridge, a router, etc. The I/O devices 63 also include components for communicating over various networks, such as the Internet or intranet.

When the computer 60 is in operation, the processor 61 is configured to execute software stored within the memory 62, to communicate data to and from the memory 62, and to generally control operations of the computer 60 pursuant to the software. The application 67 and the operating system 64 are read, in whole or in part, by the processor 61, perhaps buffered within the processor 61, and then executed.

When the application 67 is implemented in software it should be noted that the application 67 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. An extract, transform, load (ETL) pipeline system comprising:
   an interface configured to obtain a plurality of graph configuration components, each graph configuration component comprising information representative of one or more computational logic rules;
   a computation graph generator configured to generate a computation graph based on the obtained graph configuration components, the generated computation graph comprising: a node for each graph configuration component; and one or more links representative of relationships between the nodes;
   a computation graph adaptor configured to receive, from an external source, external information relating to the graph configuration components, and to adapt the generated computation graph to a directed-acyclic graph based on the external information, wherein the external knowledge comprises a prior computation graph stored in a database, and whereon the prior computation graph is added to the generated computation graph to generate the directed-acyclic graph; and
   a computation graph runner configured to run the directed-acyclic graph.

2. The system of claim 1, wherein each graph configuration component comprises at least one of:
   a database connection;
   a document;
   a data element;
   an algorithm; and
   a computational logic rule.

3. The system of claim 2, wherein the algorithm comprises a computational a data extraction rule and/or the computational logic rule comprises a computational decision rule.

4. The system of claim 1, wherein the user-defined graph configuration component comprises information redefining and/or amending one or more graph configuration components.

5. The system of claim 1, wherein a configuration component comprises a graph configuration file, and wherein the system is configured to redefine the graph configuration file or dependency information indicative of dependency relationships among different graph configuration components based on the user-defined graph configuration component.

6. The system of claim 1, wherein the system further comprises a computation graph parser configured to:
   receive the graph configuration components from the interface; and
   establish a link between different graph configuration components based on the component information and dependency information indicative of dependency relationships among different graph configuration components.

7. The system of claim 6, wherein the computation graph parser is further configured to establish a link between the data element and the document based on data items associated with the data element and/or the document.

8. The system of claim 7, wherein the data items comprise at least one of:
   an identifier;
   a timestamp;
   a content item;
   a context item; and
   an encoding object.

9. The system of claim 1, wherein the computation graph runner is further configured to run the directed-acyclic graph in an adaptive high-throughput computation.

10. A medical data processing system comprising an ETL pipeline system according to claim 1.

11. A method for extract, transform, load (ETL) pipeline processing, the method comprising:
    obtaining a plurality of graph configuration components, each graph configuration component comprising information representative of one or more computational logic rules;
    generating a computation graph based on the obtained graph configuration components, the generated computation graph comprising: a node for each graph configuration component; and one or more links representative of relationships between the nodes;
    receiving, from an external source, external information relating to the graph configuration components;
    adapting the generated computation graph to a directed-acyclic graph based on the external information, wherein the external knowledge comprises prior computation graph stored in a database, and whereon the prior computation graph is added to the generated computation graph to generate the directed-acyclic graph; and
    running the directed-acyclic graph.

12. A computer program product for extract, transform, load (ETL) pipeline processing, wherein the computer program product comprise a computer readable storage medium having program instructions embodied therewith, the program instructions executable by a processing unit to cause the processing unit to perform a method comprising:
    obtaining a plurality of graph configuration components, each graph configuration component comprising information representative of one or more computational logic rules;
    generating a computation graph based on the obtained graph configuration components, the generated computation graph comprising: a node for each graph configuration component; and one or more links representative of relationships between the nodes;
    receiving, from an external source, external information relating to the graph configuration components;
    adapting the generated computation graph to a directed-acyclic graph based on the external information, wherein the external knowledge comprises prior computation graph stored in a database, and whereon the prior computation graph is added to the generated computation graph to generate the directed-acyclic graph, and
    running the directed-acyclic graph.

13. A processing system comprising at least one processor and the computer program product of claim 12, wherein the at least one processor is adapted to execute the computer program code of said computer program product.

* * * * *